United States Patent [19]

Gold

[11] 4,354,053
[45] Oct. 12, 1982

[54] SPLICED HIGH VOLTAGE CABLE

[76] Inventor: Marvin H. Gold, 5050 Dory Way, Fair Oaks, Calif. 95628

[21] Appl. No.: 128,970

[22] Filed: Mar. 10, 1980

Related U.S. Application Data

[62] Division of Ser. No. 874,104, Feb. 1, 1978, Pat. No. 4,226,251.

[51] Int. Cl.³ .............................................. H01B 7/02
[52] U.S. Cl. .................................. 174/84 R; 174/76; 174/77 R
[58] Field of Search ................. 174/84 R, 76, 77 R; 156/48, 49, 215

[56] References Cited

U.S. PATENT DOCUMENTS

| | | | |
|---|---|---|---|
| 2,462,977 | 3/1949 | Kitchin | 174/84 R |
| 2,967,795 | 1/1961 | Bollmeier | 174/84 R |
| 3,777,048 | 12/1973 | Traut | 174/84 R X |
| 3,879,249 | 4/1975 | Filreis | 156/215 |
| 3,888,710 | 6/1975 | Burk | 156/48 |
| 3,904,541 | 9/1975 | Charlton | 156/48 X |
| 3,970,488 | 7/1976 | Nelson | 156/49 |
| 3,992,569 | 11/1976 | Hankins | 174/92 |
| 3,996,081 | 12/1976 | Nakata | 156/48 |
| 3,996,413 | 12/1976 | Foord | 156/48 X |
| 4,102,716 | 7/1978 | Groves | 156/48 |
| 4,143,099 | 3/1979 | Duncan | 525/194 X |

*Primary Examiner*—Richard R. Kucia
*Attorney, Agent, or Firm*—Mark C. Jacobs

[57] ABSTRACT

A method and composition for effecting splices of high voltage cable sections for use with a mold placed around the cable sections. The composition comprises a liquid polyolefin, a finely divided solid polyolefin and a chain extension agent capable of reacting to form addition polymer linkages with the liquid polyolefin.

11 Claims, 4 Drawing Figures

SPLICED HIGH VOLTAGE CABLE

This is a divisional of application Ser. No. 874,104 now U.S. Pat. No. 4,226,251, filed Feb. 1, 1978.

FIELD OF THE INVENTION

This invention relates to the field of electrical cable splicing and more particularly to a novel technique for providing insulated splices for high voltage cables.

BACKGROUND OF THE INVENTION

High voltage cables that are used to transmit substantial quantities of electrical power either above ground or underground, frequently require splicing either during the installation in the field, or during down time, i.e. repair. Several general techniques are known for handling such situations.

One method known to applicant is to provide a traditional cable splice, and to then take the spliced section of cable, insert it into a protective sheath or housing, and encapsulate the spliced cable segment. Such a technique and the apparatus therefore is disclosed and claimed in the Hankins et al U.S. Pat. No. 3,992,569 assigned to Hexcel Corporation.

Another technique is disclosed in Filreis et al U.S. Pat. No. 3,879,249 wherein a stiff resilient polymeric plastic sheet having a special surface of grooves and lattice work is provided and which sheet may be shaped to form a closure or mold about a splice. As a closure, dirt and dust are sealed out, and as a mold it can serve to shape insulating self-curing resinous compositions applied in a liquid form about the splice.

A very common technique employs a liquid potting method, which is reasonably economical but is primarily intended for low kilovolt transmissions because the materials available for the potting do not bond well to the cross-linked polyethylene or ethylene-propylene insulation used on high voltage cable. Applicant is aware however of a liquid slurry method claimed by Nakata in U.S. Pat. No. 3,996,081 issued Dec. 7, 1976 to be suitable for high voltage cable splice application.

One of the more popular techniques involves the use of tape wrapping followed by the application of high pressure by means of a hydraulic press and subsequent cure at elevated temperatures. This technique is not only costly, but slow, due to the careful wrapping process and the extended cure cycles. The emphasis today is on the development of in-the-field splicing techniques which hopefully can be provided quickly and cheaply while being suitable for high voltage applications. A paper covering Hexcel Corporation's research and development of a field molded splice for use on either crosslinked polyethylene or ethylene propylene rubber insulated, solid dielectric cables was presented at the IEEE Southeast Conference in 1975. This paper relating to that company's HOTSPLICER TM is incorporated herein by reference. A patent known by applicant that relates to such a tape wrapping technique, but not assigned to Hexcel is U.S. Pat. No. 3,970,488 issued July 20, 1976 to Nelson. As is recited therein, the generalized technique for making such a tapewrapped splice requires that the ends of the two cables to be spliced together are subjected to a plurality of steps. Firstly, they are prepared by removing a portion of the outer cable jacket, folding back the electrically conductive outer metallic shield, removing a portion of the underlying outer semiconducting screen, penciling the cable insulation down to the inner semiconducting screen, and removing a portion of the inner semiconducting screen to expose the central conductors. The two exposed central conductor end portions are next mechanically and electrically coupled together by means of a conventional connector, e.g. a connector sold in the trade as a CADWELD TM connector. The splice is next covered with one or more layers of semiconducting tape, and an electrically insulative jacket is molded onto the splice and adjacent regions of the cable insulation, after which a layer of semiconducting material is applied to the outer surface of the insulative mold, a layer of metal gauze material is wrapped around the semiconductive material, secured in place and soldered to the electrically conductive outer metallic shield and the splice is finished off with a layer of conventional electrician's tape.

The insulative jacket is molded to the cable splice by wrapping strips of semiconductive molding compound over the semiconducting tape, wrapping strips of electrically insulative thermosetting molding compound under heat and pressure into the mold chamber to soften the semiconducting and insulative molding compounds and bond them to the various surfaces with which they make contact, and curing the molded splice.

SUMMARY OF THE INVENTION

The concept of this invention is to provide a monolithic structure of cross linked insulation for the splice of two high voltage cables.

The cable is stripped, the semiconducting strand screen is exposed by cutting back the insulation, the insulation is shaped at its termini. The cable ends are joined by crimping the two together or by welding the fusible alloy. Semiconducting tape is wrapped in place. A mold is fixed in place, and castable composition of this invention is cast and allowed to cure to a monolithic impermeable structure which is bonded to the insulation material of the cable, and also to the semiconducting strand screen and the optional semiconducting insulation screen if present.

Accordingly it is an object of this invention to overcome the disadvantages of the prior art splicing systems.

Another object is to provide an easy to use employable cable repair system.

Yet another object is to provide a cross linked plastic outer layer for a high voltage splice that bonds to both the insulation and the semiconducting strand screen.

A further object is to provide a two step cure which includes a chain extension followed by graft copolymerization.

A yet further object is to employ as the chain extended liquid polyolefin, for reaction with the cable insulation, a polyolefin which optionally has condensable groups, which liquid polyolefin is chain extended by a free radical reaction.

For a fuller understanding of the nature of advantages of this invention, reference should be made to the following detailed description taken in conjunction with the accompanying drawings.

DESCRIPTION OF PREFERRED EMBODIMENT

Figure 1:
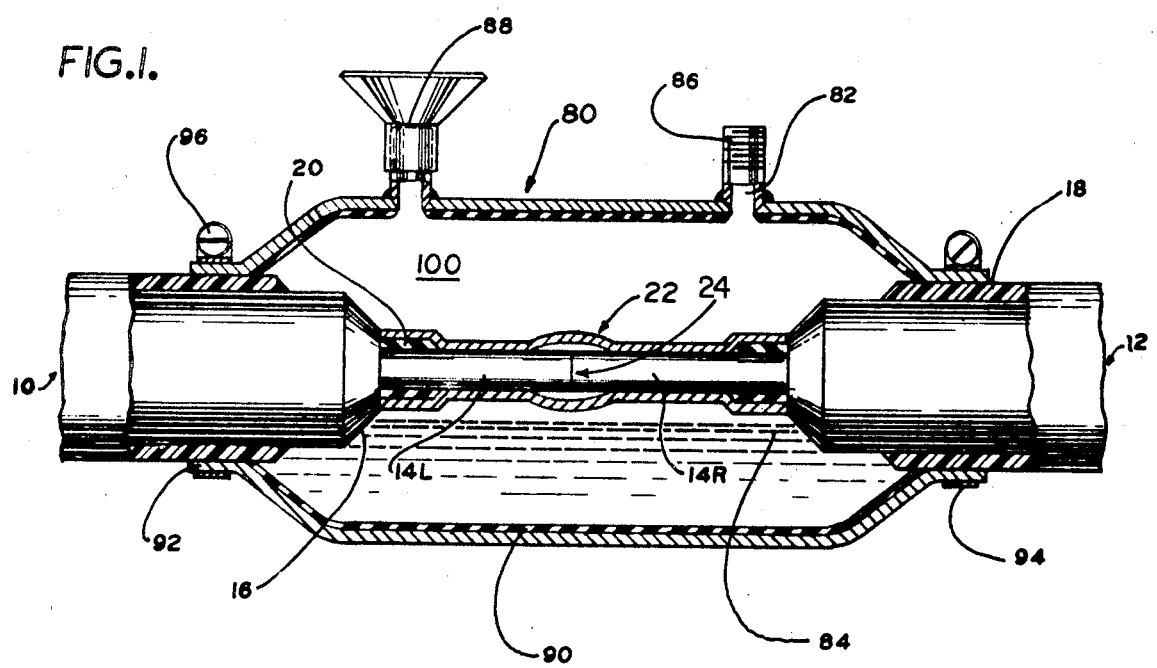
FIG. 1 is a longitudinal sectional view showing the cable splice of this invention in the mold.
Figure 2:
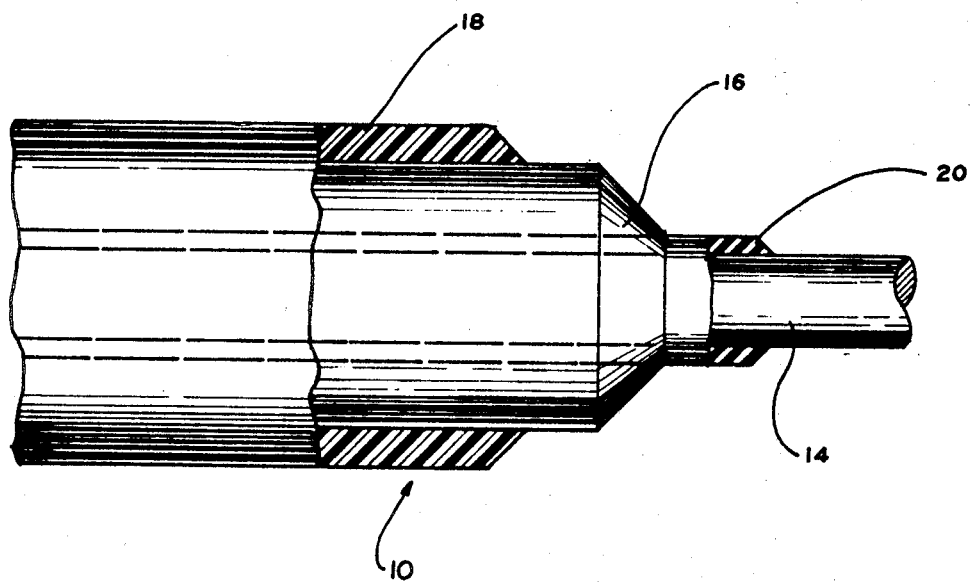
FIG. 2 is a side electrical view showing one embodiment of insulation layer end shaping according to the invention.
Figure 3:
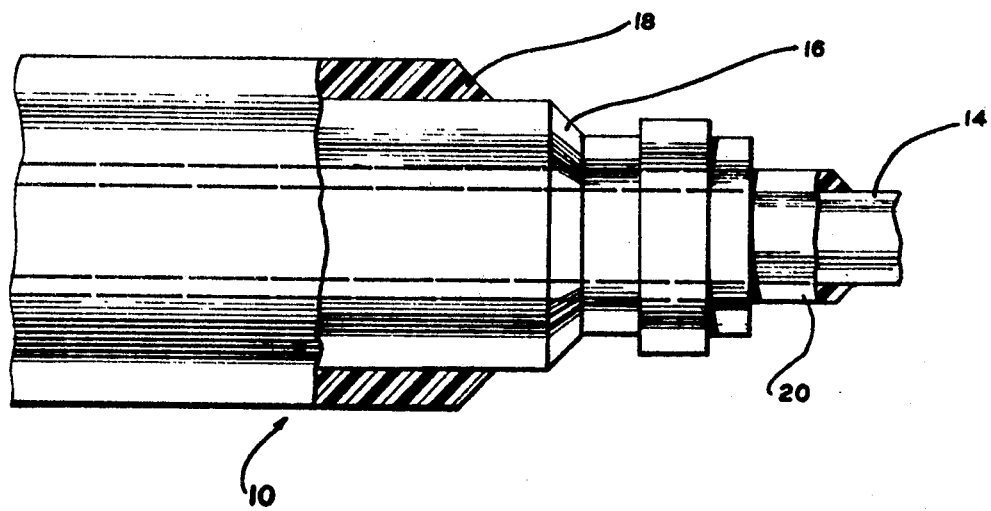
FIG. 3 is a side sectional view showing a second embodiment of insulation layer end shaping according to the invention.

As can be seen from FIG. 1, two cable sections are to be joined together, one of which is shown in both FIGS. 2 and 3. The difference between the two figures refers solely to tailoring and not to the details of the cable unit per se.

It is understood that the two cables of FIG. 1 are substantially identical and as such only one will be described in detail.

Each cable section comprises a conductor section 14, insulation 16 surrounding the conductor section, a tubular metal sheath 18 surrounding the insulation 16. Sheath 18 can be either of sheet, taped or braided construction. Each cable section, as seen in FIG. 2, has been prepared for formation of the splice by removal of insulation 16 from its end to provide an exposed end portion of the conductor section and by removal of some of the metal sheath 18 to provide exposed insulation 16 projecting past the end of the metal sheath. The end of insulation 16 is preferably formed into a tapered configuration, as illustrated in FIG. 2.

The only differences between FIG. 2's embodiment and that of FIG. 3 is in the end treatment. That end strand of FIG. 2 is designated by a pencil taper end shape while that of FIG. 3 is a notch configuration of the insulation. Either of these or any other suitable configuration for end treatment of the insulation layer 16 may be employed with the instant insulation.

Figure 4:
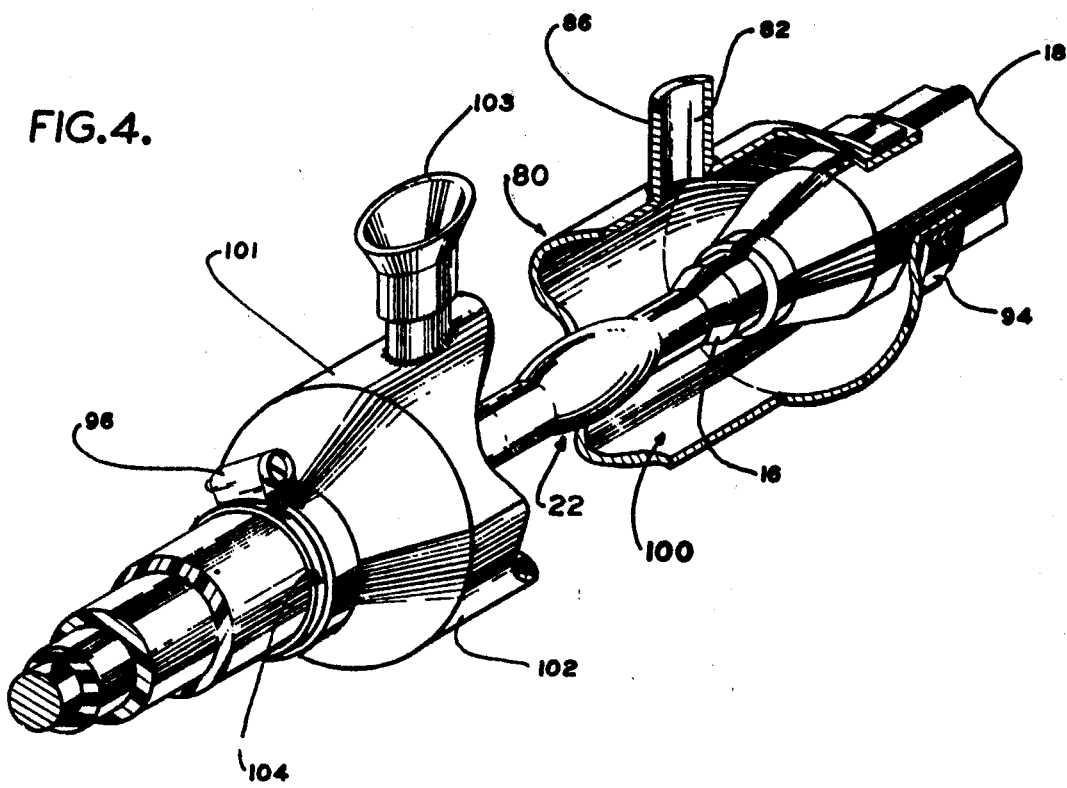
FIG. 4 is a perspective cutaway view showing a mold as in FIG. 1 with two electrically joined cable sections therein.

In order to practice my invention, the following general procedure is employed: The cables 12 and 14 to be joined are stripped clean at the ends for a sufficient length to allow for adequate handling. Then the cable insulation 16 is cut back from each end to provide adequate exposure of the semiconducting strand screen, 20. The insulation layer is end shaped using standard cutting tools preferably to a pencil taper, per FIG. 2 or a notched configuration, FIG. 3; or to any other convenient configuration. The metal cable ends, 14, are then joined by using a conventional crimping device or by welding with a fusible alloy, such as the commercially available Cadweld ® joining compound. The joint 24 is made smooth, and a uniform layer of semiconducting tape 22 is applied. The operator is urged to make sure that it, 22, overlaps the semiconducting strand screen 20 at both ends of the joint. Next, two halves of a metal mold, 80 as seen in FIG. 4, are applied and fixed in place as is known to the art. The mold preferably lined with semiconducting layer 90, is placed in a preferably horizontal position and one of the castable compositions 84 of my invention is added. Heat is then applied sufficiently to cure the specific casting composition used. Upon cure, a monolithic, water impermeable structure results within the metal mold, which is bonded to the cross linked polyethylene (or cross linked polyethylene-propylene) cable insulation and to the semiconducting strand screen 20, and to the semiconducting insulation sheath 18, if this latter is present.

As indicated above, after the cable ends, (conductors, 14L and 14R) have been joined and a covering of semiconductor material such as tape 22 is applied, the junction is placed into a mold 80.

Mold 80 may be constructed of aluminum, copper, steel, or any of the conducting alloys available in the marketplace. Preferably mold 80 is lined with a semiconducting coating 90, to protect against corona discharge. Mold 80 is placed preferably in a horizontal position, for ease of filling, and tightened in place by adjusting hose clamps 94, by tightening screws 96, on the flanges 92 of mold 80. Obviously some suitable means may be employed to prevent leakage, such as a gasket not shown, interpose between 18 and 92 if such is found necessary. Also other closure means adapted to hold the two halves of mold 80 together may also be employed.

Mold 80 is seen to have at least one entry port 82, here 2 are employed to allow for air escape during the addition to the chamber of the mold 100 of the casting compositions of this invention. These ports, 82, communicate with the chamber and have a threaded opening, 88, which is closed off by a removable threaded-in-place cap, not shown.

In order to prevent a dielectric breakdown from being initiated within the region of the junction occupied by the casting composition, 84, it is important that the resin 84 be added and maintained in such a manner as to prevent the formation of voids.

The compositions of this invention are added to chamber 100 through ports 82 in an amount sufficient to fill the chamber 100 up to the layer 90. Mix 84 is poured, pumped or injected in any manner that is known to the art. Heat is applied to the exterior of the mold 80 to be transferred to the curing resin 84. Heat may be applied by the use of strip heaters, heating jackets or the like, all of which are known to the art. The amount of heat to be applied is contingent upon the mix being added, and the particular size of the mold but is readily discernible to the skilled artisan.

The likelihood of the formation of voids in the curing resin can be substantially reduced by deaerating the resin prior to its addition to the chamber.

Upon cure, which will usually take place in longer duration of time, if the aforesaid heat is not applied, a monolithic water impermeable structure results within in the mold. Upon release of the mold portions, as by unscrewing screw 96 and removing clamps 94, it is found that the cured resin is bonded to the cable insulation 16, to the semi-conducting strand screen 20, and if, depending upon the manufacturer of the cable, an insulation screen is part of the cable as the outer most layer, it should be soldered to the metallic mold.

For the reader's information, it has been found that the insulation layer of high voltage cable is generally either cross-linked polyethylene, or cross-linked polyethylene-propylene.

In the embodiment depicted in FIGS. 1 and 4 of a mold suitable for use herein, funnels 103 have been added and are shown threadingly engaged to the threads 86 of opening 88. These funnels 103 render addition of the cast mix 84 easier. Upon completion of the cast mix addition, funnels 103 are removed and a threaded cap not shown is secured to 82. By use of such a cap no mix can escape to cause voids in the monolithic structure to be formed.

In FIG. 4, an electrically joined tape wrapped splice is shown inserted in the mold 80. This mold does not have the lining of semi-conductive mastic as is seen in FIG. 1.

The description of the mold employable herein should not be read in a limiting manner. Thus any mold with entry means for addition of the cast mix, and having suitable closure to maintain the cable ends fixedly in place during curing of the chemical composition may be employed.

In the practice of the instant invention I may employ liquid polyolefins that bear condensable side groups, addition polymer reactable side groups such as vinyl moieties or liquid polyolefins that have no reactable sites other than the internal double bonds, e.g. polybutadiene.

The first step of the instant process involves the chain extension of these polyolefins by an addition polymerization using a free radical catalyst. Since the chain extension takes place through an opening of double bonds it is seen that the condensable sides if present will not enter into the chain extension reaction. When chain extension is to take place through a condensation reaction reference should be made to my copending application Ser. No. 874,105 now U.S. Pat. No. 4,222,801 filed concurrently herewith for such subject matter.

The details of chain extension of a liquid polyolefin by an addition reaction are known to skilled artisans, and the details of same need not be recited here. Suffice it to say that in general, any low molecular weight compound capable of an addition polymerization chain reaction may be employed herein, regardless of the presence of condensable side groups.

It is seen that the chain extended liquid polyolefin is then placed in a mold, heated to gelation and then allowed to react with the cross-linked cable insulation which is usually cross-linked polyethylene or cross-linked polypropene-ethylene to form a single monolithic cross-linked pendent.

In the instant invention the liquid polyolefins to employ are those of the general formula:

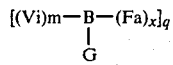

wherein Vi is a vinyl side chain; B is the backbone of the polymer and contains at least one unsaturated double bond; G represents non-reactive side group substituents selected from the group consisting of cycloalkyl, alkyl, aryl, aralkyl, iodo, bromo, chloro, cyano, carbalkoxy, and alkoxy. Fa is a functional chain-extendable moiety each of which may be the same or different. Wherein m is a number of at least 2.1, x is a number from 0 to about 5; Fa is a moiety selected from the group consisting of: —OH, —COOH, —NH$_2$, —SH, —C≡CH, —NCO,

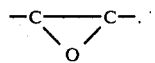

And q designates a molecular weight range of 300 to 10,000. Preferably x will vary from 0 to 5 and q will preferably range from 500 to 6,000.

Thus generically the liquid polyolefins useful in this application are those polyolefins that have addition polymer reactable sites.

According to the instant invention, it is possible to employ unsaturated liquid polyolefins(LPO) with hydroxyl, carboxyl, amino, thiol, epoxy and isocyanato functional groups thereupon. The commercial chemist will recognize that only hydroxyl, carboxyl and amino functional liquid polyolefins are readily available in the marketplace. However, the skilled artisan can prepare the other raw materials aforesaid suitable for use in this invention by utilizing the reactions set forth in my copending application previously referenced. In addition, there may be other LPO functional group molecules that can be prepared. However, for the purpose of this application, chain extension is not to take place by the reaction of these functional groups. Reactions wherein those functional groups do participate in the chain extension reaction form the subject matter of my aforesaid concurrently filed patent application. In the application at hand, chain extension takes place by addition polymerization by double bond opening.

While several techniques are known for the chain extension of LPO molecules, I prefer the reaction of bis-mercaptans with the olefinic groups therein using free radical initiation. These chain extenders are best suited for LPOs which contain no functional groups other than the vinyl or internal backbone unsaturation. If groups such as isocyanate, epoxy, and the like are present, which react with thiol, there can be a tendency toward hindrance of the intended reaction.

As bis-mercaptans that may be employed for the chain extension reaction, mention may be made of ethylene glycol bis mercaptoacetate, the preferred compound, polyethylene glycol dimercaptoacetates, ethylene glycol bis mercaptoproprionate; 2,2'-dimercapto diethyl ether; 1,3,propane dithiol; 1,3-butanedithiol; 1,4-butanedithiol; dithioerythritol, dithiothreitol; 1,6-hexane thiol; 1,9-nonanedivinylcyclohexene dimercaptan, p-menthane-2,9-dithiol, dithiohydroquinone,radical initiator, when used as chain extenders for the liquid polyolefins. In the instant technique, these polymers aren't isolated however.

As examples of the free radical initiators known to the art, I may employ dicumyl peroxide (Di Cup) and any others listed below.

The temperature range to be employed for the first step of my process, namely the chain extension, may vary between 50° C. and 110° C.

Despite the availability of functional groups on many of the liquid polyolefins, it is often desirable or advantageous to use a dimercaptan to chain extend, even though chain extension by other means may be practiced as well. Thus for example where the LPO constitutes a mixture of a polyolefin having thiol groups thereon, and an olefin with no functional groups, a mercaptan substituted LPO may serve to react with and chain extend the non-functional LPO.

For definitional purposes in this application, it is seen that only chain extension compounds that will react with the LPO by the opening of double bonds may be employed. Thus, if the LPO contains pendent condensible groups such as hydroxyl, then the chain extender must be free of groups capable of reaction with hydroxy groups. If however, the LPO has no pendent condensible groups such as hydroxy, then the chain extender may contain such condensible groups.

As examples of other possible chain extenders employable herein under the conditions set forth above, mention may be made of polyhalo compounds of the type, α,α,α,ω,ω,ω, hexachloro, and hexabromo alkanes and mixed hexahalo alkanes such as 1,1,1,6,6,6-hexachloro hexane, 1,1,1,8,8,8-hexabromo octane, 1,1,10,10-tetrachloro 1,10-dibromo decane, 1,12dichloro-1,1,12,12-tetrabromo dodecane, α,α,α,α',α',α',-hexachloro xylenes α,α,α',α',-tetrachloro-α,α',-dibromo xylenes, etc.

As has been indicated above, the LPO which has been chain extended is mixed with a solid polyolefin (PE) which is preferably finely divided and used as the casting composition with the cable insulation. The purpose of employing the solid olefin is to produce a graft polymerization of the residual unsaturation within the chain extended LPO with the (PE) as well as the reaction of the LPO with active hydrogen atoms of the cable insulation by free radical polymerization initiated by the peroxide present. These reactions serve to reduce unsaturation, ie. sensitivity to oxidation and electrical breakdown, reduces shrinkage on cure and therefore inhibits stress-cracking upon cooling to ambient temperatures. These two reactions take place simultaneously to form a strongly bonded single composite structure including the cable insulation.

While the term (PE) has been used, the solid finely divided polyolefin can be not only polyethylene, but also polypropylene, polyethylene-propylene, polybutene, polypentene, polyhexene polycyclohexene, polystyrene, polyvinyl toluene, polyethylene-vinyl acetate copolymer, polystyrene-butadiene and polyvinyl chloride among others. Only those polymers, cystalline or not, which are not readily swollen by the balance of the liquid castable system of this invention at ambient temperature can be employed.

It is advantageous to have a mixture of various particle sizes of the finely divided high molecular weight solid polyolefin to achieve maximum packing density of the fine particles and still yield good castability. Thus I prefer a polymodal size distribution. Needless to say, the solid polyolefin can consist of a plurality of the members of those within the class provided that each member meets the criteria set forth above. I have found that the addition of 25 to 60 percent of the weight of the total system of the (PE) is satisfactory, and that 40 to 50% by weight addition provides good flow characteristics.

THE CHEMISTRY TECHNIQUE

The casting compositions for reaction with the cable insulation according to the this invention are prepared by premixing the ingredients under vacuum to eliminate entrapped gas and air bubbles. There are a variety of standard differential speed, batch and continuous type mixers which may be employed. The blades may be horizontally or vertically oriented. The mixer is loaded with the liquid polyolefin, optionally a second liquid polyolefin if chain extension is to be carried out internally, as defined herein, and/or one or more chain extending agents, an optional viscosity reducing agent, such as a liquid diolefin, as is discussed herein, and of course the finely divided solid polyolefin. This solid polyolefin may be bimodal, as is discussed in detail herein, as well as trimodal which is also contemplated herein. Mixing is carried out under vacuum for all of the ingredients.

If immediate useage is to transpire on site, then any catalysts required should also be included in the mixture, such that chain extension to gelation can commence. The mix is then placed into the mold with the pre-prepared insulation section, heat applied, and reaction with the insulation allowed to take place.

If however, field use is contemplated, and the activated reaction mix is not shelf storable then the catalysts should not be added to the mixer, but packaged separately, and the main reaction mix should be packaged for shipment to the field location. For such field useage, I prefer to unload the mixer by loading the casting mix into plastic bags of predetermined size according to the intended size of the electrical splice. These bags after filling are to be evacuated to remove any possible entrapped air and then sealed. The plastic bags preferably have a divided section or partition or plastic capsule, which will contain catalyst or catalysts, dissolved or dispersed in a non-volatile liquid, which preferably has therein dissolved a dye of distinctive color. (This non-volatile liquid may be any of the subsequently mentioned monomeric liquid diolefines such as diallyl phthalate, etc.). When it becomes necessary to prepare the liquid casting system for use, the plastic container and contents are warmed by some convenient means to a temperature which provides adequate fluidity, the partition removed or broken and the catalyst mixture kneaded into the casting slurry until a uniform mix as determined by color is achieved. Then the bag is conveniently cut or punctured at one end and the casting slurry poured or squeezed into the ports or funnel of the metal mold prepared for the splice. Squeezing out the contents of the plastic bag may be conveniently carried out by hand or the bag may be inserted into a reservoir of a hydraulic or screw actuated injector. While the mold is being filled, I have found that it may be convenient to aid in the removal of entrapped air bubbles by mechanical vibration. This can be done by attaching any of the commercial types of air or electrically driven mechanical vibrators to the body of the mold. The casting mix is poured into the mold until it is completely full and rises up into the stem of the ports or funnel. Heat is then slowly applied until the first cure temperature is reached. In general this will be in the range of 50°–110° C. although I usually prefer a range of 70°–100° C. However it may also be higher or lower than these temperatures. For either site or field use, heating is maintained at this initial cure temperature until gelation has been achieved. Generally this may require about 20 to 50 minutes and then the temperature is elevated up to the final cure temperature. I have found that a convenient and practical range for cure is between 135°–180° C. At these temperatures the reaction mixture can effectively soften and penetrate into the surface of the cross-linked cable insulation and form a homogeneous bond by graft polymerization with that surface, as well as with the suspended solid polyolefine particles. In general I have found that good cures can be achieved when the total mass of the splice has been held at the desired cure temperature for about 30 to 120 minutes. As would be expected, the rate of cure is a function of temperature and the catalyst used. Although more rapid cures may be attained at the higher temperatures, there is less strain imposed upon the total system after cooling, if the cure temperature is maintained in the lower range.

It is to be understood that while I have suggested the use of a mono or multi compartment plastic bags or plastic cartons that are inert and not reactable with the mixture, the use of same is not required and is not critical to this invention. The advantage of same however, is that packages or billets may be pre-prepared for field use at a master facility.

In practicing my invention I prefer to use any of a variety of commercially available liquid polyolefines. Many such materials are the so-called liquid polybutadienes, although they may also be copolymers of butadiene-acrylonitrile or butadiene-styrene, and they may also contain minor amounts of other monomers, which provide specific types of functional end groups.

Typical examples of commercially available liquid polyolefines are those produced by B. F. Goodrich Chemical Company under the trade name Hycar CTB, CTBN, CTBNX and ATEN; Phillips Petroleum Company's Butarez CTBB, HTPB and NF series; United Technology's CBAN and ABAN liquid elastomers; ARCO Chemical Company's R-45M and R-45HT series; and there are many others. It is also within the scope of this invention to use liquid polyolefins, based on isoprene, cyclohexadiene, cyclopentadiene, cyanoprene, conjugated vinyl cyclohexene and chloroprene.

Any of the diolefines may be copolymerized with each other as well as butadiene and with or without acrylonitrile, styrene and other monomers, which may provide functional groups. Generally these liquid polyolefines are relatively low in molecular weight, ranging preferably from 2000 to 5000, but they may also be lower or higher than these values i.e. 1500 to 6000.

Since it is preferable to use materials of low viscosity to obtain the most desirable flow characteristics, I have found it advantageous to dilute some of the higher viscosity liquid polyolefines with low volatility, liquid, monomeric non-conjugated diolefines. As preferred divalent monomers the diallyl phthalates, allyl diglycol carbonate (PPG Chemical's CR-39), hydroquinone diallyl ether, resorcinol diallyl ether, 1,9-decadiene, divinyl cyclohexanes, or any other of the myriad forms of non-conjugated doubly unsaturated hydrocarbons may be used as dilutents. Although they are more reactive, I have also found that any of the isomers or mixed isomers of divinyl benzene may also be used as diluents, as well as the commercially available low viscosity unsaturated polyesters.

Since I prefer long pot lives at ambient temperatures for the practice of my invention, I normally limit the amount of initiating catalyst to the minimum level necessary to achieve initiation at an elevated temperature. For catalysis of chain growth I prefer the reactions to initiate in the range of 70° to 100° C., although lower or higher temperatures may be used. Certain catalysts at low enough concentration and reactivity at ambient temperatures may be added at the factory at the time of initial batch preparation of the castable composition. Otherwise the catalysts are withheld for addition just prior to use.

Where the liquid polyolefine is resistant toward polymerization and requires higher temperatures to achieve initial gelation, I prefer to use a higher melting or less soluble, solid polyolefine powder. I have found that it is particularly advantageous to have a substantial viscosity increase or gelation occur before reaching the solution or melting temperature of the solid polyolefine. On the other hand it is also possible to achieve this initial gelation at somewhat lower temperatures by the use of a more reactive initiating catalyst. In either case the objective is to attain a substantial viscosity increase or gelation prior to raising the temperature above the solution or melting temperature of the solid polyolefine to maintain a fixed and uniform distribution of all of the ingredients while the final stages of polymerization and grafting are achieved.

In the practice of my invention it will frequently be necessary to have two or more different catalysts as well as promotors present to initiate the different sequential steps of the polymerization. One, for instance, for chain extension and another for reaction with the insulation and the solid polyolefine. Ideally it would be simplest to include all of the catalytic reagents at the time when all the other ingredients are blended together. In some systems this will be possible but in most instances it can lead to substantially reduced shelf life. Shelf life can be enhanced by the use of common procedures, however. For maximum extension of pot life it is best to add the catalyst just prior to casting and cure in the splicing mold. Nevertheless, it is within the scope of my invention to add all, one, or none of the catalytic agents at the time of initial mixing of the ingredients. This is entirely dependent upon the nature and reactivity of the ingredients and catalysts selected for any given casting formulation.

Thiols do require free radical initiation for reactions across a double bond as well as the subsequent graft polymerization with the solid polyolefin and the cross-linked insulation. Therefore, according to my invention, I have found that the commercially available organic peroxides can be used to catalyze chain growth in the reactions of dimercaptans with liquid polyolefines and the graft polymerization. As catalysts I particularly prefer to use benzoyl peroxide, t-butyl perbenzoate, di-t-butyl peroxide, t-butyl-perpivalate, bis-(2-ethylhexyl)percarbonate, dicumyl peroxide, bis-(t-butylperoxy)-diisopropylbenzene, 2,5-dimethyl-2,5-di-t-butylperoxyhexane, 2,5-dimethyl-2,5-di-t-butylperoxy hexyne-3, n-butyl-4, 4-bis(t-butylperoxy)valerate, 1,1-bis(t-butylperoxy), 3,3,5-trimethyl cyclohexane and there are many others. Furthermore it may also be advantageous to use certain promotors such as cobalt naphthenate or tertiary amines in conjunction with the peroxide catalysts.

EXAMPLE 1

To 20 g. of ARCO R45HT (a hydroxyl substituted polybutadiene of molecular weight 2800) was added 1.5 grams, an equivalent amount, of ethylene glycol bis mercaptoacetate and 0.5 g of benzoyl peroxide. After thorough stirring the mixture was heated in an oven at 65° C. for 5.5 hours. A substantial increase in viscosity was observed but it did not reach the point of gelation. The temperature was then raised to 160°–165° C. and within one hour gelation was observed. After a total of two hours at 160°–165° C. the reaction vessel was cooled to ambient temperature. The mix had formed a soft rubbery gel.

EXAMPLE 2

To 20 g of ARCO R45HT was added 0.726 ml (0.64 equivalent) of ethylene glycol bis mercaptoacetate and 0.4 g of benzoyl peroxide. After a thorough mixing the ingredients were placed in an oven at 60° C. for 4 hours, yielding a highly viscous oil. The temperature was then raised to 160°–165° C. for one hour. Upon cooling a soft rubbery gel was obtained.

EXAMPLE 3

A bimodal polyethylene composition was made by mixing 60 g of a 20 micron polyethylene with 140 g of a 50 mesh polyethylene.

(a) To 20 g of ARCO R45HT several increments of the above prepared bimodal mixture of polyethylene powder were added. After 15 g of the polyethylene powder had been added, the total mixture was still quite fluid and castable. One g of benzoyl peroxide was stirred in and then 13 g of the total mixture of 36 grams by weight, was decanted off into an aluminum lined cup. This sample was heated in an oven for 15 minutes at 90° C. and then at 160°–165° C. for two hours. Upon cooling a hard, tough resin was recovered.

(b) To the remaining 23 g of the total prepared in 3a above, was added 0.81 g of ethylene glycol bis mercaptoacetate. Some of this well stirred mixture was poured into an aluminum lined cup and heated for 30 minutes at 65° C. There was a substantial viscosity increase at this point. The temperature was then raised to 115° C. for 30 minutes and then to 160°–165° C. for 45 minutes. Upon cooling a tough, rubbery, resinous product was obtained.

The skilled artisan would readily recognize from an inspection of the products of (a) and (b) above that the addition of the mercaptan chain extender yields a more elastomeric product in experiment 3b.

EXAMPLE 4

To a mixture of 10 g of diallyl phthalate and 10 g of ethylene glycol bis mercaptoacetate was added 2.5 g of a 40% solution of dicumyl peroxide in diallyl phthalate (40% DiCup-DAP). Immediately an exotherm was observed and within a few minutes there was a substantial increase in viscosity. After one hour at 101°–102° C. a very thick, viscous resin was obtained.

Diallyl phthalate catalyzed by dicumyl peroxide, with no other additions, cures very slowly at 100° and requires much higher temperatures for a satisfactory cure to a hard plastic. This is known to the art, citation omitted.

EXAMPLE 5

Goodrich Hycar VTBNX, a vinyl terminated, butadiene-acrylonitrile copolymer liquid product, 15 grams, was mixed with 1 gram of 40% DiCup-DAP. Six such mixes were prepared. To two were added 5 grams of diallyl phthalate, to two were added 5 grams of PPG CR-39, which is allyl diglycol carbonate.

To the last two were added the 5 grams of diallyl phthallate and 5.71 grams of ethylene glycol bis mercaptoacetate. The Hycar was not readily miscible with the CR-39 or the diallyl phthalate alone, but the third set of samples with the mercaptan added turned to a clear solution. In all cases there was a substantial reduction in viscosity. One of the two of each pair of solutions was heated to 90° C. for 45 minutes, at which time there was a significant viscosity increase. Then the temperatures were raised to 110° C. for 1.5 hours. By then all 3 samples had gelled. While the samples without the mercaptan were hard rubbers, the one with mercaptan was a soft rubbery product.

When the second sample of the three types was mixed with particulated solid polyethylene, 15 grams, and (18.7 g with the third containing mercaptan) and cast into a mold in conjunction with a small piece of cross-linked polyethylene cable insulation, a cured monolithic structure was formed when the same cure cycle as set forth above was employed. The three samples so prepared were all deemed satisfactory. The differences between them being that the first two samples were much harder than the one containing the mercaptan chain extending agent.

EXAMPLE 6

Effect of Increases in Chain Extender Content

Three mixtures were prepared of ARCO R45HT with ethylene glycol bis mercaptoacetate, the mercaptan at three equivalence ratios. The R45HT polyolefin has an average molecular weight of 2800.

| | | |
|---|---|---|
| (a) | R45HT | 20 g |
| | The Mercaptan | 2.013 g (equivalence) |
| | 40% DiCup-DAP | 1 g |
| (b) | R45HT | 20 g |
| | The Mercaptan | 2.086 g (5% excess) |
| | 40% DiCup-DAP | 1 g |
| (c) | R45HT | 20 g |
| | The Mercaptan | 2.159 g (10% excess) |
| | 40% DiCup-DAP | 1 g |

From sample 6b 10 g was decanted into a separate container and into this was stirred 7.5 g of a bimodal mixture of polyethylene powder as prepared in accordance with example 3 to prepared 6d. All four samples were allowed to stand in warm air for about one hour to allow escape of entrapped air bubbles. Heating was then initiated at 90° C. for 30 minutes, followed by another 30 minutes at 110° C. At this point all four samples had gelled. Heating was continued at 125°–130° C. for another ninety minutes and samples (a), (b), and (c) were allowed to cool. Sample (d) was heated to 150°–155° C. for another hour. Samples (a), (b), and (c) gave soft, resilient rubbers but (c) soon cracked, indicating that the excessive cross-link level imposed at the elevated cure temperature had developed too much stress upon cooling to room temperature. Sample (d), containing the polyethylene, yielded a hard, tough, resilient rubber. When example 6c was carried out using 10 g of a solution of sample 6c to which was added the 7.5 g of the bimodal polyethylene, and the processing of 6d, it was found that product remained intact upon cooling. Apparently cross-linking by graft polymerization to the polyethylene inhibited stress buildup.

EXAMPLE 7

Variation of Liquid Polyolefin and Mercaptan

In this example two different liquid polybutadienes were chain extended with two different dimercaptans. The ARCO R45HT has an average molecular weight of 2800 and contains hydroxyl functional groups. The Phillips Butarez NF has an average molecular weight of 5000 and no functional groups. In each case the equivalent amount of mercaptan was used, taking into account sufficient to react with the diallyl phthalate used to dissolve the dicumyl peroxide catalyst.

| | | |
|---|---|---|
| (a) | R45HT | 20 g |
| | Ethylene glycol bis mercaptoacetate | 1.756 g |
| | 40% DiCup-DAP | 0.5 g |
| | Benzoyl peroxide | 0.5 g |
| (b) | R45HT | 20 g |
| | Ethylene glycol bis mercaptopropionate | 1.99 g |
| | 40% DiCup-DAP | 0.5 g |
| | Benzoyl peroxide | 0.5 g |
| (c) | Butarez NF | 20 g |
| | Ethylene glycol bis mercaptoacetate | 1.016 g |
| | 40% DiCup-DAP | 0.5 g |
| | Benzoyl peroxide | 0.5 g |
| (d) | Butarez NF | 20 g |
| | Ethylene glycol bis mercaptopropionate | 1.242 g |
| | 40% DiCup-DAP | 0.5 g |
| | Benzoyl peroxide | 0.5 g |

Two 10 g portions were decanted into a separate cup from each of the above four well mixed samples. To one of each of the four different 10 gram portions was stirred in 7.5 g of bimodal polyethylene powder. All eight cups were then heated at 80° C. for 30 minutes, by which time slight gelation had been observed. The temperature was raised to 110° C. for 30 minutes and then to 125°–130° C. for about 2.25 hours. Upon cooling, soft rubbers were obtained from each of the four non polyethylene containing samples and those containing the polyethylene were strong, resilient resins, having good bulk characteristics.

EXAMPLE 8

To 20 g of Phillips Petroleum's Butarez NF, a liquid polyolefin (containing no functional groups) was added 1.352 g of ethylene glycol bis mercaptoacetate and 1 g of 40% DiCup-DAP. After thorough mixing 10 g was decanted off into a separate container. To this separate 10 g was blended in 7.5 g of bimodal polyethylene powders, see ex. 3. The two samples were first heated at 80° C. for 25 minutes and then the temperature was slowly raised to 115° C., where they both gelled after 45 minutes. Finally the temperature was brought up to 150°–155° C. for another hour and then allowed to cool. The polyethylene free sample was soft and rubbery, while that containing the polyethylene additive was hard and rubbery.

EXAMPLE 9

Adhesion to Cross-Linked Polyethylene

A mixture was prepared from 20 g of ARCO R45HT, 2.013 g ethylene bis mercaptoacetate and 1 g of 40% DiCup-DAP. This was divided into four portions and into each sample was placed a piece of cross-linked polyethylene, cut from the insulation on a power cable. All four samples were first heated at 90° C. for 30 minutes, then 110° C. for 30 minutes. (By this time all the samples had gelled). Then the temperature was raised to 125°–130° C. for 45 minutes and one sample was removed. After heating at 150°–155° C. for 60 minutes a second sample was removed. The remaining two samples were heated at 165°14 175° C. for another 25 minutes and sample 3 was removed. The final sample was heated 15 minutes longer at 185°–190° C. There appeared to be a tight bond between the cross-linked polyethylene and the rubbery binder in all four samples, but there was very little apparent difference in the bond strengths of the four samples.

EXAMPLE 10

Mold Manufacture and Use

The following constitutes a procedure for the preparation of a mold to be utilized in accordance with the techniques of this invention for the preparation of splices of high-voltage cable. It is readily understood that when molds 80, necessary to this invention, are to be prepared on a commercial basis other modes of manufacture that are more conducive to lower costs may be employed.

An aluminum mold 80 was prepared by cutting a 14" length of 2" wide schedule 5 aluminum tubing. According to specification, this material has a 2.375 inch outside diameter and a 2.25 inch inside diameter. To each end was brazed a 60° cone of aluminum with the larger diameter of the cone equal to the exterior diameter of the tube. A portion of the tapered section of each cone was removed to leave a 15/16" opening at each end, 104. The tube with 2 tapering ends was then longitudinally sawed in half. To one of the halves at 4" from each end, in a straight line, was brazed a 1" length of ⅜" O.D. aluminum tubing which had been previously flared to provide a funnel-like opening. Holes were drilled through the inside diameters of the funnel tubes to provide fluid communication of the funnel to the main part, or chamber of the mold. The configuration of the two halves was to ensure that the longitude of the mold halves correctly abutted along the entire length thereof to prevent leakage of cast mix when such is added through the funnel tubes. This construction differs slightly from that of the figures, but the net effect of having funnel openings is the same.

The interior of each half of the mold was thoroughly cleaned and several costs of semi-conducting paint were applied with adequate time being provided for drying between the application of each coat. A total layer of thickness of about 1/16" was found suitable. The mold was now ready for use.

Two 12" lengths of 27 KV aluminum power cable having an O.D. of 15/16" were cut and trimmed as shown in FIG. 2, leaving 2" bare conductor exposed followed by ¾" of semi-conductor cable screen. A metal crimp was used to join the conductors. After sanding and wiping with acetone, two layers of semi-conducting tape were wrapped over the bare wire and the crimp seal overlapping the semi-conductor shield of the cable. The aluminum shell mold was placed symmetrically around the spliced cable and clamped tightly over the cable by means of standard screw tightened clamps. The assembly was placed in a horizontal position with the funnel tubes upstanding and ready for cast addition.

A 1000 gram batch of the formulation of Example 8 which had been previously prepared was added through one of the inlet funnels and allowed to flow into and fill the mold chamber up into the two inlet tubes approximately half way to the top of the funnels. The assembly was supported in a horizontal position, placed in an oven at 75°–80° C. for 90 minutes for gelation to transpire. The temperature was raised to 125°–130° C. for an hour, and finally to 150°–160° C. for another 80 minutes. Upon cooling, a monolithic electrical splice assembly was recovered. The insulation material, which was cross linked polyethylene was found to be fully bonded to the material which had been cast into the mold and allowed to harden.

EXAMPLE 11

Dielectric Strength Measurements

The following four samples of casting mixture were prepared:

| (a) | ARCO-R45HT | 60 g. |
|---|---|---|
|  | Ethylene glycol bis mercaptoacetate | 6 g. |
|  | 40% DiCup-DAP | 3 g. |
| (b) | ARCO-R45HT | 40 g. |
|  | Ethylene glycol bis mercaptoacetate | 6 g. |
|  | Bimodal polyethylene | 30 g. |
|  | 40% DiCup-DAP | 2 g. |
| (c) | Phillips - Butarez NF | 60 g. |
|  | Ethylene glycol bis mercaptoacetate | 3.55 g. |
|  | 40% DiCup-DAP | 3 g. |
| (d) | Phillips - Butarez NF | 40 g. |
|  | Ethylene glycol bis mercaptoacetate | 2.70 g. |
|  | Bimodal polyethylene | 30 g. |
|  | 40% DiCup-DAP | 2 g. |

The samples were degassed under vacuum for 30 minutes or more and cast into a 6"×6"×1/16" mold, placed in a heated press and cured at gradually increasing temperatures up to 180°-185° C. All the samples still retained a substantial number of fine air bubbles. Circles 3.5 inches in diameter were cut from each of the sheets and measured for dielectric strength at an independent laboratory. The tests were run by the ASTM Test D149 rapid rise method at a rate of 3 KV/second rise. Although each of the samples contained many bubbles, the dielectric strength measured for all four samples were in the range of 500-600 volts per mil.

EXAMPLE 12

Polystyrene as a Filler

To 25 g. of R45HT was added 22 g. of polystyrene crystals, 2 g. of ethylene glycol bis mercaptoacetate and 1.2 g of 40% DiCup-DAP. The fluid mixture was heated at 115°-120° C. for 30 minutes and then at 170° C. for 30 minutes. Upon cooling there remained about ⅛" of rubbery binder on top, indicating that a greater ratio of polystyrene could have been used. The casting was a very tough hard rubbery mass. It was thus determined that a polystyrene filler would be valuable for use in the invention of this application.

Since certain changes may be made in the above products, compositions and processes without departing from the scope of the invention herein involved, it is intended that all matter contained in the above description shall be interpreted solely as illustrative and not in a limiting sense.

What is claimed is:

1. Spliced high voltage cable prepared from a splicing of two insulation and conductor portions, said spliced cable comprising:
   electrically and mechanically joined conductor portions, and,
   a monolithic cured polymeric insulation splice prepared by the reaction of a castable mixture comprising a liquid polyolefin having addition polymer reactable sites, a chain extension agent reactive with said polyolefin's reactive sites, and a particulated solid saturated polyolefin with the two insulation portions.

2. The cable splice of claim 1 wherein the castable mixture contains an organic diluent.

3. The cable splice of claim 1 wherein the castable mixture contains a catalyst.

4. The cable splice of claim 1 wherein the liquid polyolefin is selected from the group consisting of polybutadiene, butadiene-styrene, butadiene-acrylonitrile, isoprene, and cyclohexadiene.

5. The cable splice of claim 1 wherein the insulation portions are selected from the group consisting of crosslinked polyethylene, and crosslinked polyethylene-propylene.

6. The cable splice of claim 1 wherein the particulated solid polyolefin is selected from the group consisting of saturated polyethylene, polypropylene, and polystyrene.

7. Spliced cable as in claim 1 wherein the insulation is selected from the group consisting of crosslinked polyethylene, polyethylenepropylene, and the reaction with the castable mixture is carried out as a two step two temperature reaction.

8. Spliced high voltage cable as in claim 1 wherein the reaction of the castable mixture with the insulation is carried out as a two step two temperature reaction.

9. Spliced cable as in claim 7 wherein the castable mixture further includes an organic diluent and a catalyst.

10. Spliced high voltage cable prepared as in claim 3 wherein the liquid polyolefin is a compound of the formula:

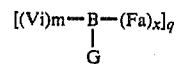

wherein Vi is a vinyl side chain; B is the backbone of the polymer and contains at least one unsaturated double bond; G represents non-reactive side group substituents selected from the group consisting of cycolalkyl, alkyl, aryl, aralkyl, iodo, bromo, chloro, cyano, carbalkoxy, and alkoxy; Fa is a functional chain-extendable moiety selected from the group consisting of: —OH, —COOH, —NH₂, —SH, —C≡CH—, —NCO, and

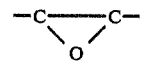

each of which may be the same or different; wherein m is a number of at least 2.1, x is a number from 0 to about 5; and q designates a molecular weight range of 300 to 10,000.

11. Spliced high voltage cable prepared from a splicing of two insulation and conductor portions said cable splice comprising:
   electrically and mechanically joined conductor portions, and
   a monolithic cured polymeric insulation splice prepared by the reaction of a castable mixture comprising a liquid polyolefin having addition polymer reactable sites, a chainthe liquid polyolefin has condensable pendent groups thereon.

* * * * *